W. FAVREAU.
SEGMENTAL HINGE.
APPLICATION FILED APR. 11, 1908.
935,594.
Patented Sept. 28, 1909.
2 SHEETS—SHEET 2.
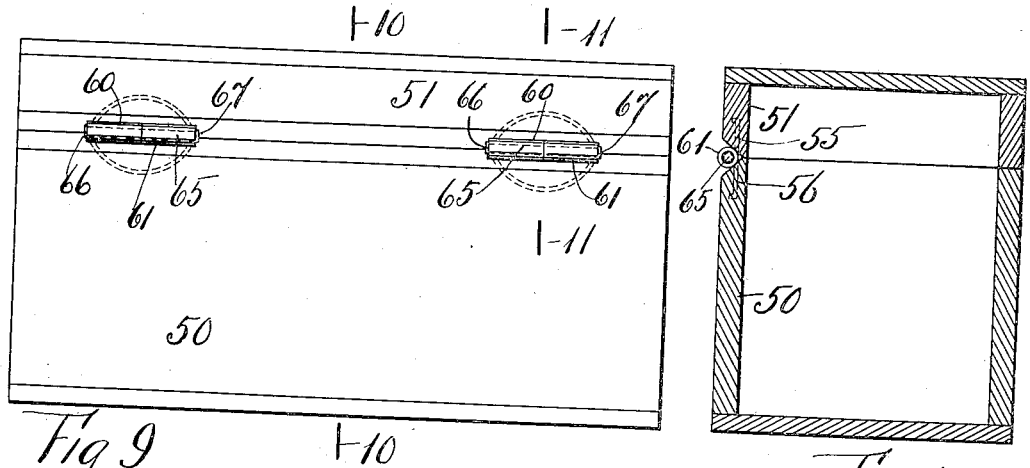
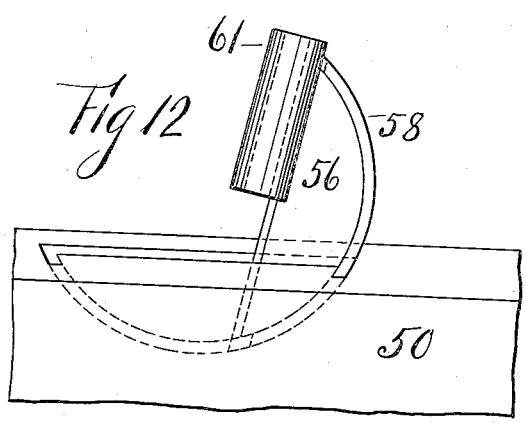
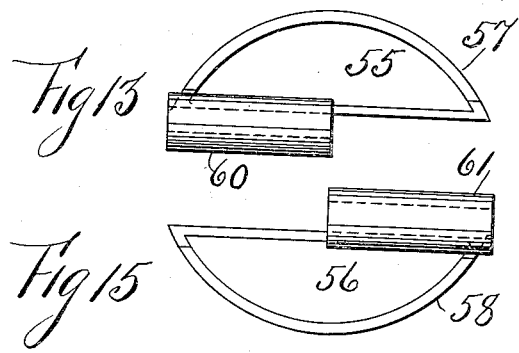
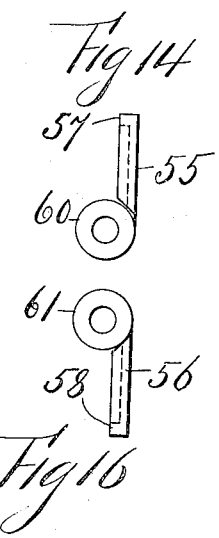
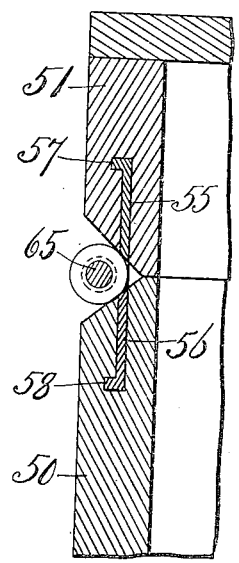
Witnesses
M. H. Cook
Martin Ziminsky
Inventor
Walter Favreau
By his Attorney
A. A. de Bomeville

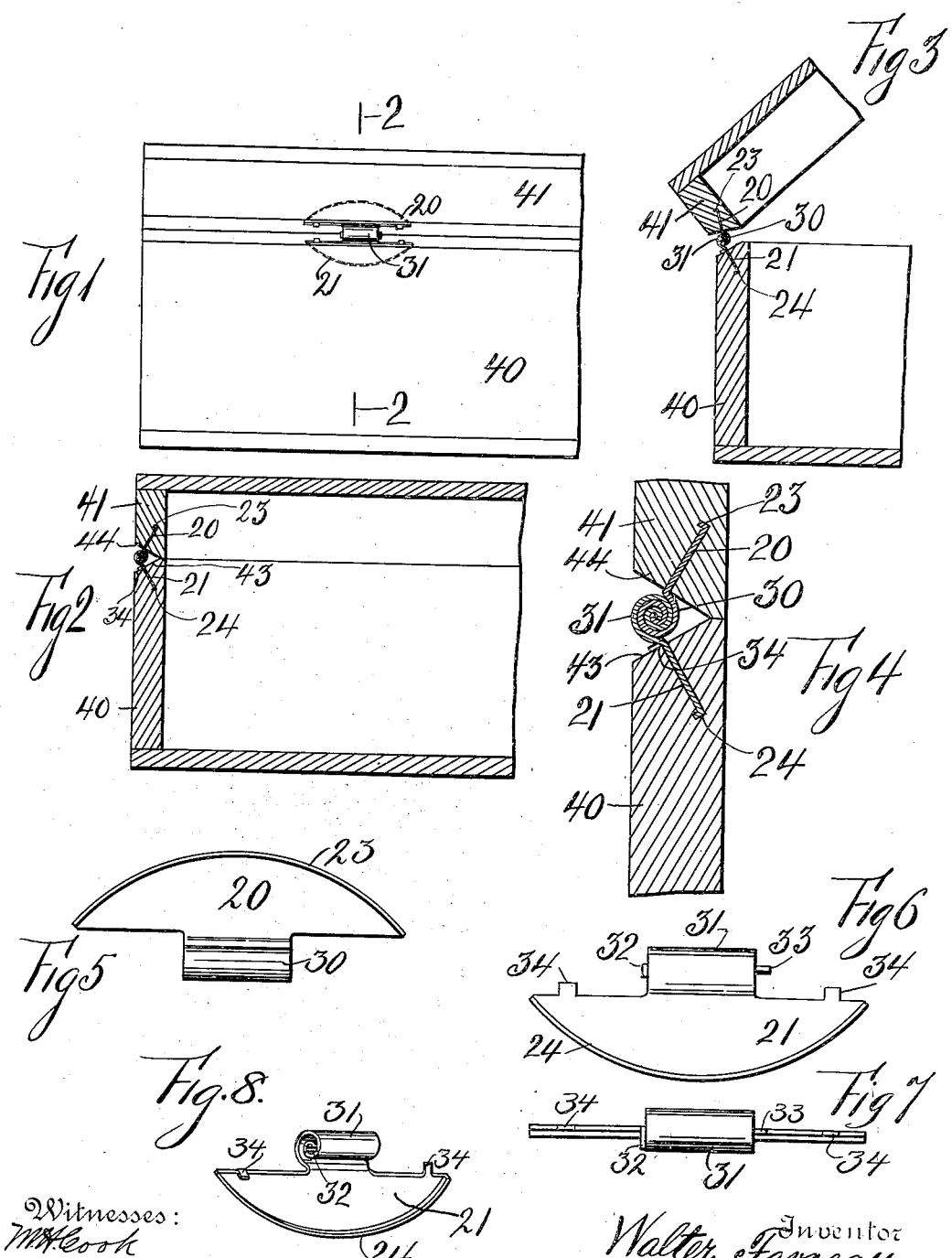

UNITED STATES PATENT OFFICE.

WALTER FAVREAU, OF NEW YORK, N. Y.

SEGMENTAL HINGE.

935,594. Specification of Letters Patent. Patented Sept. 28, 1909.

Application filed April 11, 1908. Serial No. 426,431.

*To all whom it may concern:*

Be it known that I, WALTER FAVREAU, a subject of the Empire of Germany, and a resident of the borough of Manhattan, in the county of New York and State of New York, have invented certain new and useful Improvements in Segmental Hinges, of which the following is a specification.

This invention relates to hinges, and its object is the production of a segmental hinge which can be securely located in the members of a box and the like, without the use of nails, screws or other special fastening devices.

In the drawings Figure 1 represents an elevation of a hinge with a box and its cover, the latter closing the former, Fig. 2 shows a partial section of Fig. 1 on the line 2, 2, Fig. 3 is a view similar to Fig. 2 with the cover partly raised, Fig. 4 represents an enlarged portion of Fig. 2, Fig. 5 is an elevation of one member of the hinge before being joined with its accompanying member, Fig. 6 shows an elevation of the second or accompanying member of the hinge, Fig. 7 is a top view of Fig. 6, Fig. 8 represents a perspective view of Fig. 6 on a reduced scale, Fig. 9 represents a modified form of hinge with a box and its cover, Fig. 10 shows a section of Fig. 9 on the line 10, 10, Fig. 11 is an enlarged section of Fig. 9 on the line 11, 11, Fig. 12 represents an enlarged portion of Fig. 9 with one of the members of the hinge partially in position, Fig. 13 shows an elevation of one of the members of the hinge, Fig. 14 is an end view of Fig. 13, Fig. 15 shows an elevation of the accompanying member of the hinge, and Fig. 16 represents an end view of Fig. 15.

Referring to Figs. 1 to 8, the hinge is shown to consist of the segmental member 20 and its accompanying or second segmental member 21. The outer edges of each of said members are arcs of circles and have formed therewith the flanges 23, 24. From the member 20 extends a spiral sleeve 30, which engages a spiral sleeve 31 of the member 21. Lips 32 and 33 extend from the opposite ends of the sleeve 31, the tip 32 being represented as parallel to and extending across one of said ends, and the lip 33 at the other end of said sleeve as parallel to the longitudinal axis thereof. Lugs 34 may extend from the said segmental members as shown for the member 21. The box to which the member 21 is secured has the rear wall 40, and the cover thereof is represented with the rear wall 41. Both of said walls have mortises to engage the members 20, 21 and their flanges 23, 24. The adjoining faces 43 and 44 of the walls 40 and 41 are preferably beveled as shown. To unite the members of the hinge and locate them in the box and its cover, each member is pushed into its respective mortise, and if the members are provided with the lugs 34 the latter are bent to positions perpendicular to the planes of said members to engage with the said beveled faces. The sleeves 30 and 31 are then engaged with each other and the lip 33 is bent over to a plane parallel to the lip 32, when the members of the hinge will be securely locked. The spiral sleeves are sufficiently distant from the ends of the members 20, 21 and from the flanges 23, 24 to be easily moved into place. It will be noted that the spiral sleeves, in addition to joining the box with its cover, perform the functions of a spring between them, and tend to spring open the cover of the box, and may be termed spiral spring sleeves. Each member 20 and 21 is the segment of a circle, the center of which lies beyond the junction of the box with its cover, by reason of which the hinges cannot work themselves out of position from their mortises, after having been placed therein, in other words the hinge cannot turn on its circumferential edges.

In Figs. 9 to 16 which show a modification of the invention, a box is shown with the rear wall 50, having the cover with the rear wall 51. The hinge has the segmental members 55, 56 having respectively the flanges 57 and 58 perpendicular to the planes thereof. From the member 55 extends the cylindrical sleeve 60 and from the member 56 extends the cylindrical sleeve 61. The members of the hinge are located in the mortises of the box and its cover, with the sleeves 60 and 61 axially in line. A hinge pin 65 with a head 66 is placed in the openings in the sleeves, and the end of the pin 65 is upset as shown at 67.

Having described my invention, I claim:

1. In a hinge the combination of segmental members, flanges extending from said members, sleeves extending from said members and engaging with each other.

2. In a hinge the combination of segmental members, flanges extending therefrom, sleeves formed with said members, and means to lock the sleeves with each other.

3. In a hinge the combination of segmental members, flanges extending therefrom, spiral sleeves extending from the segmental members and engaging with each other.

4. In a hinge the combination of segmental members, flanges extending from the circular edges of the members, spiral sleeves formed with the members engaging with each other, lips extending from one of the sleeves and bearing against the edges of the other sleeve.

5. In a hinge the combination of segmental members, flanges extending from the circumferential edges of said members, lugs extending from the cords of the segmental members to bear against the upper edges of mortises of elements to which they are attached, spiral sleeves extending from the segmental members and engaged with each other, lips extending from one of the said spiral sleeves to lock the members of the hinge together.

6. In a hinge the combination of a pair of members, spiral spring sleeves formed with the members engaging each other, lips extending from one of the sleeves and bearing against the ends of the other sleeve.

7. In a hinge the combination of segmental members, flanges extending from the circumferential edges of the members, spiral spring sleeves extending from the cords of the segmental members and engaged with each other, and means to lock the sleeves together.

Signed at the borough of Manhattan in the county of New York and State of New York this 8 day of April A. D. 1908.

WALTER FAVREAU.

Witnesses:
J. ALBERT,
HENRY BREUNICH.